United States Patent
Bregler et al.

(10) Patent No.: US 10,674,438 B2
(45) Date of Patent: Jun. 2, 2020

(54) RESTRICTING ACCESS TO EXTERNAL SCHEMAS FROM WITHIN A DATABASE LEVEL CONTAINER BY WHITELISTING ALLOWED SCHEMAS

(71) Applicant: SAP SE, Walldorf (DE)

(72) Inventors: Jonathan Bregler, Kraichtal (DE);
Alexander Bunte, Heidelberg (DE);
Arne Harren, Walldorf (DE); Andreas Kellner, Birkenau-Löhrbach (DE);
Daniel Kuntze, Bruchsal (DE); Simon Lueders, Walldorf (DE); Volker Sauermann, Dossenheim (DE);
Michael Schnaubelt, Leimen (DE);
Le-Huan Stefan Tran, Malsch (DE)

(73) Assignee: SAP SE, Walldorf (DE)

( * ) Notice: Subject to any disclaimer, the term of this patent is extended or adjusted under 35 U.S.C. 154(b) by 124 days.

(21) Appl. No.: 15/637,698

(22) Filed: Jun. 29, 2017

(65) Prior Publication Data
US 2019/0007895 A1    Jan. 3, 2019

(51) Int. Cl.
*G06F 17/00*     (2019.01)
*H04W 48/16*     (2009.01)
*G06F 8/60*      (2018.01)
*G06F 9/445*     (2018.01)
*G06F 16/28*     (2019.01)
*G06F 16/25*     (2019.01)

(52) U.S. Cl.
CPC .............. *H04W 48/16* (2013.01); *G06F 8/60* (2013.01); *G06F 9/445* (2013.01); *G06F 16/25* (2019.01); *G06F 16/285* (2019.01)

(58) Field of Classification Search
CPC ........... G06F 16/2246; G06F 16/24545; G06F 3/0481; G06F 12/023; G06F 16/2237
See application file for complete search history.

(56) References Cited

U.S. PATENT DOCUMENTS

| | | |
|---|---|---|
| 7,124,148 B2 | 10/2006 | Sauermann |
| 7,222,308 B2 | 5/2007 | Sauermann et al. |
| 7,231,387 B2 | 6/2007 | Sauermann et al. |
| 7,257,599 B2 | 8/2007 | Sauermann et al. |
| 7,310,719 B2 | 12/2007 | Von Bergen et al. |
| 7,337,295 B2 | 2/2008 | Von Bergen et al. |
| 7,373,340 B2 | 5/2008 | Sauermann et al. |
| 7,403,495 B2 | 7/2008 | Sauermann |
| 7,415,458 B2 | 8/2008 | Sauermann |
| 7,447,987 B2 | 11/2008 | Sauermann |

(Continued)

OTHER PUBLICATIONS

Non-Final Office Action issued in U.S. Appl. No. 15/637,531 dated May 9, 2019, 42 pages.

(Continued)

*Primary Examiner* — Truong V Vo
(74) *Attorney, Agent, or Firm* — Fish & Richardson P.C.

(57) ABSTRACT

An external database schema permitted to be accessed from a container using a database synonym is determined. A logical schema representing the external database schema is defined. A synonym for the container is defined using the logical schema and an object associated with the external database schema. The logical schema and synonym is deployed to the container using a logical schema plugin. The container is configured to disable the logical schema plugin and to only allow references to the defined logical schemas.

20 Claims, 5 Drawing Sheets

(56) References Cited

U.S. PATENT DOCUMENTS

| | | |
|---|---|---|
| 7,454,454 B2 | 11/2008 | Sauermann |
| 7,487,165 B2 | 2/2009 | Sauermann et al. |
| 7,574,676 B2 | 8/2009 | Sauermann |
| 7,590,683 B2 | 9/2009 | Bergen et al. |
| 7,610,582 B2 | 10/2009 | Becker et al. |
| 7,647,592 B2 | 1/2010 | Sauermann |
| 7,653,452 B2 | 1/2010 | Sauermann et al. |
| 7,664,858 B2 | 2/2010 | Sauermann |
| 7,665,030 B2 | 2/2010 | Sauermann et al. |
| 7,685,510 B2 | 3/2010 | Sauermann |
| 7,725,900 B2 | 5/2010 | Sauermann |
| 7,730,053 B2 | 6/2010 | Sauermann |
| 7,752,628 B2 | 7/2010 | Sauermann |
| 7,797,286 B2 | 9/2010 | Sauermann |
| 7,873,666 B2 | 1/2011 | Sauermann |
| 7,900,155 B2 | 3/2011 | Sauermann |
| 8,074,206 B2 | 12/2011 | Sauermann et al. |
| 8,078,985 B2 | 12/2011 | Sauermann |
| 8,108,798 B2 | 1/2012 | Sauermann |
| 8,171,422 B2 | 5/2012 | Sauermann |
| 8,203,972 B2 | 6/2012 | Sauermann |
| 8,224,938 B2 | 7/2012 | Sauermann |
| 8,510,710 B2 | 8/2013 | Harren et al. |
| 8,621,385 B2 | 12/2013 | Sauermann et al. |
| 9,026,525 B2 | 5/2015 | Harren et al. |
| 9,026,857 B2 | 5/2015 | Becker et al. |
| 9,047,105 B2 | 6/2015 | Kinder et al. |
| 9,069,832 B2 | 6/2015 | Becker et al. |
| 9,600,269 B1 | 3/2017 | Bregler et al. |
| 9,704,168 B2 | 7/2017 | Chauhan et al. |
| 2004/0122865 A1 | 6/2004 | Stahl et al. |
| 2004/0220893 A1* | 11/2004 | Spivack .............. G06F 9/451 706/46 |
| 2005/0044110 A1 | 2/2005 | Herzenberg et al. |
| 2005/0055331 A1 | 3/2005 | Sauermann et al. |
| 2006/0005017 A1 | 1/2006 | Black et al. |
| 2006/0179058 A1 | 8/2006 | Bram et al. |
| 2008/0046462 A1 | 2/2008 | Kaufman et al. |
| 2009/0265314 A1 | 10/2009 | Kindsvogel et al. |
| 2010/0082549 A1 | 4/2010 | Hollingsworth et al. |
| 2011/0054266 A1 | 3/2011 | Dhino et al. |
| 2014/0215385 A1 | 7/2014 | Sauermann |
| 2015/0106736 A1 | 4/2015 | Torman et al. |
| 2016/0072817 A1 | 3/2016 | Makhervaks et al. |
| 2016/0085841 A1 | 3/2016 | Dorfman et al. |
| 2016/0094681 A1 | 3/2016 | Wu |
| 2016/0179850 A1 | 6/2016 | Martin et al. |
| 2016/0182315 A1 | 6/2016 | Salokanto et al. |
| 2016/0182327 A1 | 6/2016 | Coleman et al. |
| 2016/0294881 A1 | 10/2016 | Hua et al. |
| 2017/0177892 A1 | 6/2017 | Tingstrom et al. |
| 2017/0322991 A1 | 11/2017 | Tran et al. |
| 2017/0323112 A1* | 11/2017 | Tran .............. G06F 16/214 |
| 2018/0062956 A1 | 3/2018 | Schultz et al. |
| 2019/0005074 A1 | 1/2019 | Bregler et al. |
| 2019/0005108 A1 | 1/2019 | Bregler et al. |
| 2019/0163772 A1 | 5/2019 | Bregler et al. |
| 2019/0005054 A1 | 10/2019 | Bregler et al. |

OTHER PUBLICATIONS

Non-Final Office Action issued in U.S. Appl. No. 15/637,554 dated Jun. 7, 2019, 15 pages.

U.S. Appl. No. 15/824,041, Bregler et. al., "Reserving Key Specifications," filed Nov. 28, 2017, 37 pages.

Final office action issued in U.S. Appl. No. 15/637,554 dated Oct. 21, 2019, 16 pages.

Final office action issued in U.S. Appl. No. 15/637,531 dated Nov. 29, 2019, 19 pages.

Non-final office action issued in U.S. Appl. No. 15/637,554 dated Jan. 24, 2020, 16 pages.

* cited by examiner

RESTRICTING ACCESS TO EXTERNAL SCHEMAS FROM WITHIN A DATABASE LEVEL CONTAINER BY WHITELISTING ALLOWED SCHEMAS

CROSS REFERENCE TO RELATED APPLICATIONS

This application is related to and filed in conjunction with U.S. patent application Ser. No. 15/637,554, filed on Jun. 29, 2017, entitled "OPTIMIZED RE-DEPLOYMENT OF DATABASE ARTIFACTS"; which is also related to and filed in conjunction with U.S. patent application Ser. No. 15/637,531, filed on Jun. 29, 2017, entitled "DATABASE-LEVEL CONTAINER GROUP MANAGEMENT"; which is also related to and filed in conjunction with U.S. patent application Ser. No. 15/637,601, filed on Jun. 29, 2017, entitled "DEPLOYMENT OF INDEPENDENT DATABASE ARTIFACT GROUPS", the entire contents of each application and together are hereby incorporated by reference.

BACKGROUND

SAP HANA is an in-memory, column-oriented, relational database management system. The HANA platform is fundamentally based on the principle of pushing down data-intensive computations into a HANA database layer in order to benefit from HANA's in-memory capabilities and to avoid unnecessary data transfers between the database layer and an application layer. Computations can be pushed down using, for example, SQL SCRIPT procedures, different types of database views, application functions, etc.

HANA Deployment Infrastructure ("HANA DI" or "HDI") is a service layer of the HANA database that simplifies the deployment of HANA database objects by providing a declarative approach for defining database objects (as design-time artifacts) and ensuring a consistent deployment into the database, based on a transactional all-or-nothing deployment model and implicit dependency management. HANA DI is focused only on deployment aspects and addresses both development and modeling scenarios as part of the HANA database.

Deployment of database objects using HANA DI is based on a container model where each container corresponds to a database schema. Containers can be used for multiple deployments of the same database artifacts and for other uses (for example, development sandboxes). Containers are isolated against each other by database means (for example, each database schema with its deployed database objects is owned by a per-schema technical database user). By default, a cross-container access at the database level is not possible.

SUMMARY

The present disclosure describes restricting access to external schemas from within a database level container by whitelisting allowed schemas.

In an implementation, an external database schema permitted to be accessed from a container using a database synonym is determined. A logical schema representing the external database schema is defined. A synonym for the container is defined using the logical schema and an object associated with the external database schema. The logical schema and synonym is deployed to the container using a logical schema plugin. The container is configured to disable the logical schema plugin and to only allow references to the defined logical schemas.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, access to other schemas can be restricted in the database or another database by using synonyms and projection views. Second, specific schemas can be enabled in the database or in another specific database to be accessed by synonyms and projection views. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
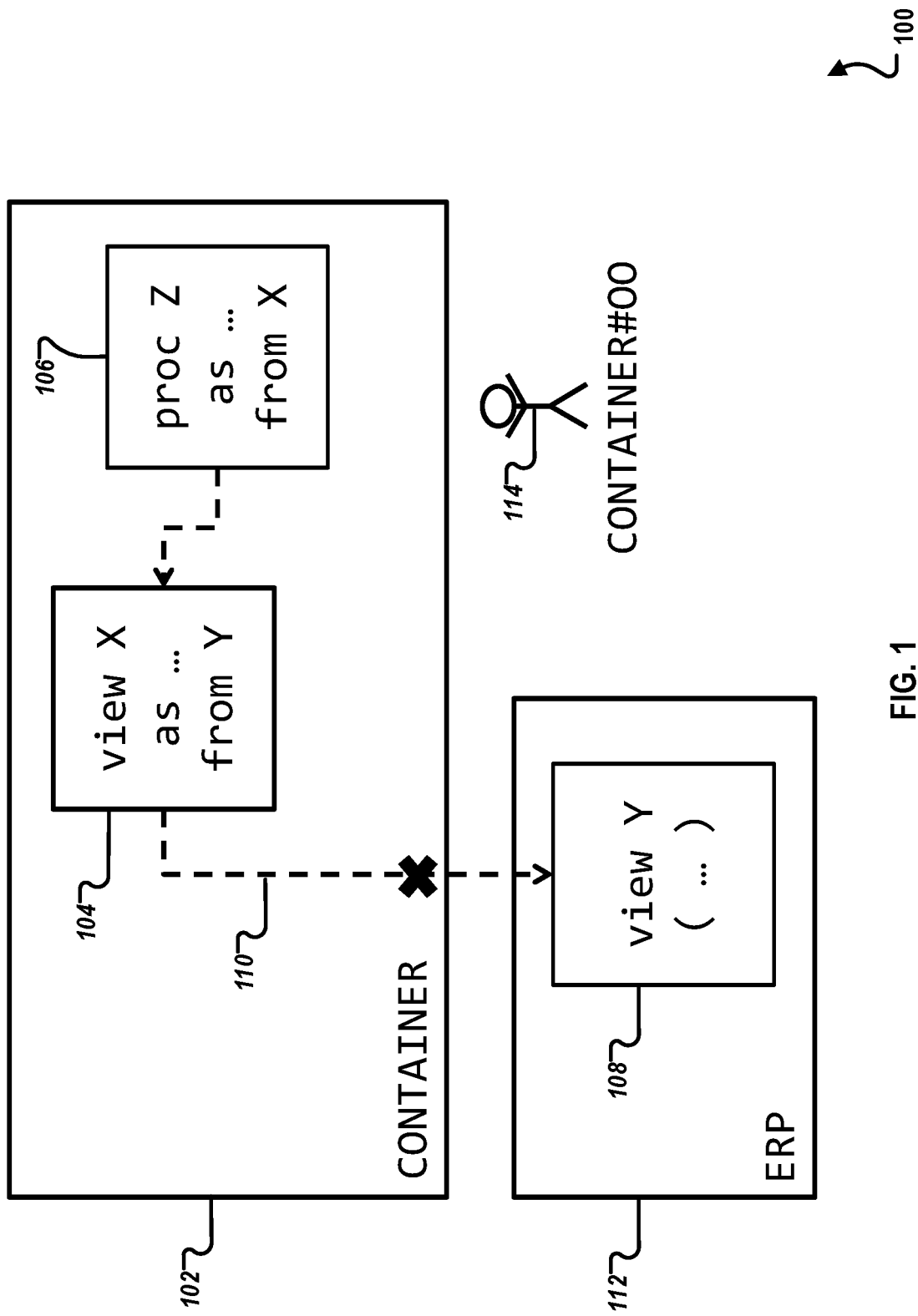
FIG. 1 is a block diagram illustrating example external access restrictions associated with an SAP HANA database container, according to an implementation.

The following detailed description describes restricting access to external schemas from within a database level container by whitelisting allowed schemas, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

For purposes of understanding, this disclosure is focused on discussion of the described methodology and subject matter with respect to the SAP HANA in-memory database platform. However, the described methodology and subject matter is also applicable to conventional- and hybrid-type database platforms, and discussion related to the SAP HANA platform is not meant to limit the disclosure or scope of the described subject matter in any way, or to limit applicability to other database platforms.

SAP HANA is an in-memory, column-oriented, relational database management system. The HANA platform is fundamentally based on the principle of pushing down data-intensive computations into a HANA database layer in order to benefit from HANA's in-memory capabilities and to avoid unnecessary data transfers between the database layer and an application layer. Computations can be pushed down using, for example, SQL SCRIPT procedures, different types of database views, application functions, etc.

HANA Deployment Infrastructure (HANA DI) is a service layer on top of the HANA database that simplifies the deployment of HANA database objects by providing a declarative approach for defining a database object (as a design-time database artifact (or "artifact")) and ensuring a consistent deployment into the database, based on a transactional all-or-nothing deployment model and implicit dependency management. In typical implementations, for creating, modifying, and deleting objects inside the database, HANA DI uses SQL commands. HANA DI is configured to run inside its own process as part of a HANA database cluster (for example, one process per logical database).

HANA DI is focused only on deployment/re-deployment aspects and addresses both development and modeling scenarios as part of the HANA database. In typical implementations, non-deployment aspects (for example, version control and lifecycle management) are not handled by HANA DI, but in both the cloud and on premise as part of overall development and deployment architecture and infrastructure. As will be appreciated by those of ordinary skill in the art, in some implementations, the HANA DI can be configured to implement, manage, trigger, or execute some or all non-deployment aspects.

The HANA DI provides infrastructure for all deployment aspects. The interpretation of artifacts is performed by HANA DI build plugins with access to a deployment container using a SQL-based Application Programming Interface (API). In this way, all commands needed by the build plugins are configured take database security constraints into account and to be available at the SQL layer of HANA. At a lower-level and in typical implementations, to be exposed to the design-time world using the HANA DI, SQL commands must be configured to support transactional deployment where DDL and DML, statements are run inside a single database transaction in non-auto-commit mode.

Deployment of database objects using HANA DI is based on a container model where each container corresponds to a database schema. Containers can be used for multiple deployments of the same database artifacts and for other uses (for example, development sandboxes). Containers are isolated against each other by database means (for example, each database schema with its deployed database objects is owned by a per-schema technical database user). By default, a cross-container access at the database level is not possible; but, can be granted using database privileges. To allow deployment of the same database objects into different containers, database objects need to be written in a schema-free way (that is, not using explicit schema references).

The HANA DI makes use of and considers technical users, (for example, a technical deployment user for a specific schema-based container) for security aspects of HANA DI deployment. Deployment-related activities (for example, staging of files and triggering real deployment into a single container) are typically performed by a dedicated technical deployment user. Therefore, a fine-grained security control on the level of files or HANA DI build plugins is not required, because the technical deployment user is required to have full control in an appropriate container. In typical implementations, the owner of a container schema is configured to be different than the technical deployment user to allow for separation of privileges for deployment and runtime access to deployed database objects. In the case of a development or modeling scenario, fine-grained security control is performed by the development infrastructure.

FIG. 1 is a block diagram 100 illustrating example external access restrictions associated with an SAP HANA database container, according to an implementation. Illustrated container 102 is considered equivalent to a database schema and contains an example database view 104 and a database procedure 106. By default, database view 104 is isolated at the database level from view 108 (using attempted access 110) in Enterprise Resource Processing (ERP) system 112. For the purposes of this disclosure, ERP 112 can be considered another container.

By default, container object owner 114 has almost no privileges. For example, container object owner 114 is a restricted database user with "CREATE ANY" on a database schema, but with no external access privileges. References to objects external to the database schema (that is, within container 102) are not permitted.

Described is an enhancement to the HANA DI permitting restriction of access to external schemas from within a database level container by whitelisting allowed schemas. In general, applications deployed in a HANA DI database level container can only access database objects residing in a particular container schema. Synonyms are aliases for database objects (for example, tables or views). Projection views are database views whose target is specified by providing a target database, target schema, and target object (similar to synonyms).

However, using synonyms and projection views is a way to break out of the container schema and access other schemas in the database or even in another database. To be able to control these types of access, the HANA DI has been enhanced with three features that can be used to create a whitelist of schemas to which synonyms and projection views may point:

1) Logical schema definition/logical schema artifact,
2) Container configuration parameter for disabling build plugins, and
3) Enforce the use of logical schemas.

A logical schema is a mapping of a logical name to a real schema name. When a logical schema artifact is deployed by a logical schema plugin in a container, the mapping is stored in metadata associated with the container. In typical implementations, there is only one logical schema plugin. In typical configurations, the logical schema plugin exists only once in a system. Metadata containing mappings from logical names to actual schema names for all deployed logical schema definitions exists per container. The logical schema plugin extracts the "schema" field from the logical schema artifact and persists it as metadata.

In some implementations, synonym and projection view configurations provide two ways of defining a schema containing an accessed database object. Either the schema is explicitly given using the "schema" field of the configuration or the configuration contains a "logical schema" field. The latter creates a deployment dependency to a logical schema definition that is deployed separately.

In typical implementations, logical schema definitions have the following JSON format:

```
{
    "<logical schema 1>" : {
        "target": {
            "schema"    : "<the target schema>" // mandatory, not empty and different
                        // from the container schema
        }
    },
    "<logical schema 2>" : {
        "target": {
            "schema"    : "<the target schema>" // mandatory, not empty and different
                        // from the container schema
        }
    },
    <...>
}.
```

In typical implementations, a logical schema definition file can contain multiple definitions. Additionally, the "schema" field of a target description is mandatory, must not be empty, and must be different from the container schema.

An example, logical schema Plugin Configuration can be:

```
.hdiconfig
    "hdblogicalschema" : {
        "plugin_name"    : "com.sap.hana.di.logicalschema",
        "plugin_version": "2.0.0.0"
    }.
```

Synonyms and projection views can then refer to the logical name without knowing the schema they will finally point to during deployment. Due to dependency management, the target schema of a logical schema definition can be changed in a later deployment, which results in a redeployment of all synonyms and projections views referring to the logical schema.

Figure 2:
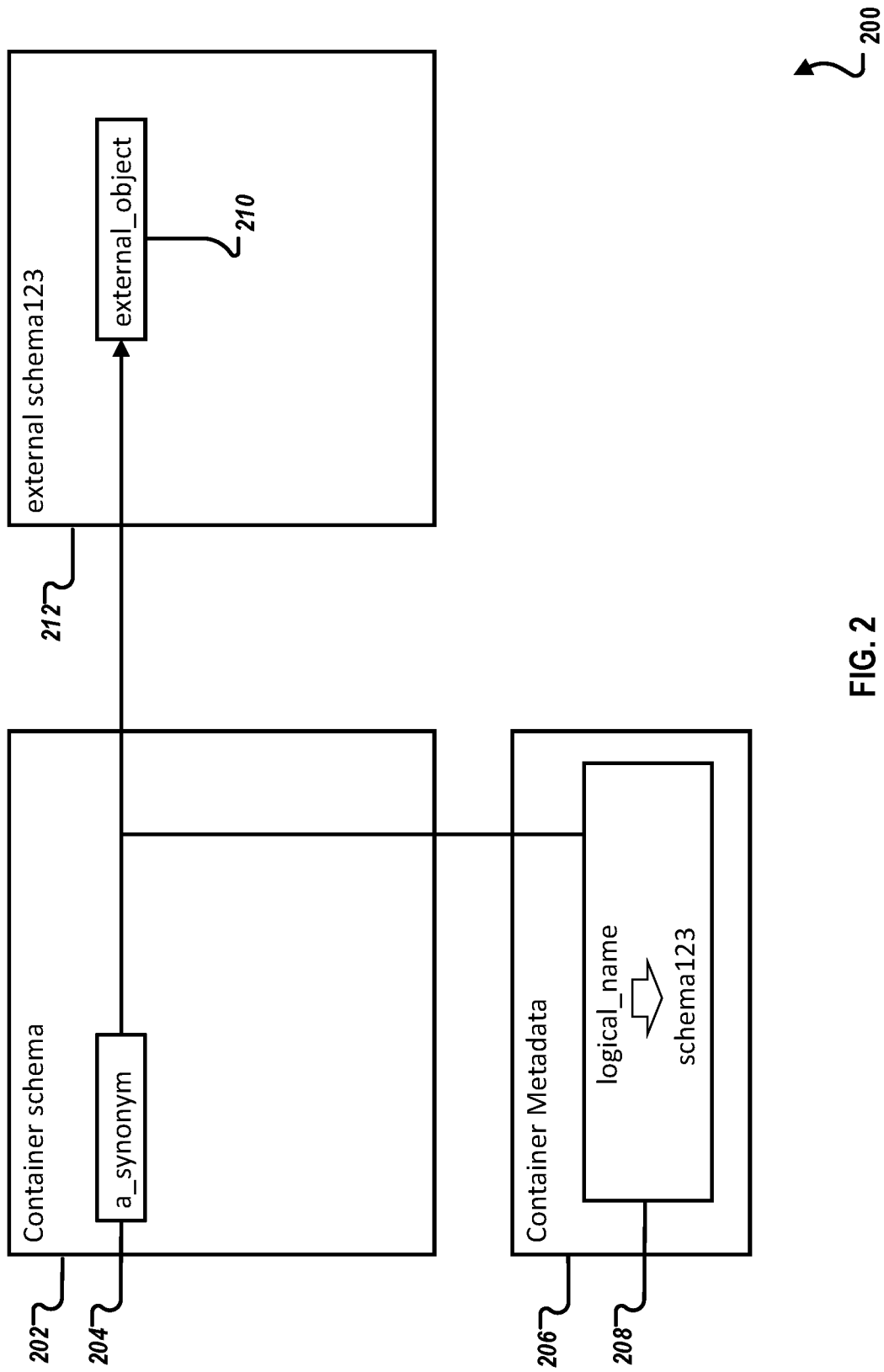
FIG. 2 is a block diagram illustrating a logical schema definition/logical schema artifact enhancement, according to an implementation.

FIG. 2 is a block diagram 200 illustrating a logical schema definition/logical schema artifact enhancement, according to an implementation. As illustrated, container schema 202 contains a synonym 204 (logical schema artifact a_synonym).

Synonyms permit references to schema-external objects to be declared (for example, a synonym object itself), which are bound using a binding configuration (for example, a synonym binding configuration) during deployment. The synonyms provide schema-local names for the schema-external objects. Privileges on these schema-external objects must be explicitly granted to the container's technical user (for example, SELECT-WITH-GRANT-OPTION privileges on schema-external ERP tables).

The binding configuration is created before deployment, because it depends on the concrete installation. The same is true for virtual tables, virtual functions, and table links. HANA remote sources are not provided as design-time artifacts, because they are system-specific and require administrative privileges for creation. Database objects which use remote sources (for example, virtual tables) are split into two components at design-time: 1) the main artifact and 2) a binding configuration artifact. Binding configuration artifacts bind to the concrete remote source in the system and need to exist before deployment. The same applies to synonyms and table links (projection views).

Here, a_synonym 204 is an ordinary database synonym that points to logical_name (208). external_object (210). Logical_name is not a schema, but a logical schema name that is actually mapped to external schema123 212 as it is defined in the Container Metadata 206. If an a_synonym 204 is used, it will resolve to external schema 123 (212).external_object (210). Within container metadata 206, mapping 208 maps a logical schema name (specified with the definition of synonym 204) to an external schema (schema123 212). Mapping is performed on a schema level (that is, the logical schema name maps to the external schema, schema123 212. In this way, the synonym 204 can refer to the logical name without knowing the exact name of the external schema that will be pointed to during actual deployment. As previously stated, the target schema of synonym 204 can be changed in a later deployment, which results in a redeployment of all synonyms and projections views referring to the logical schema.

Figure 3:
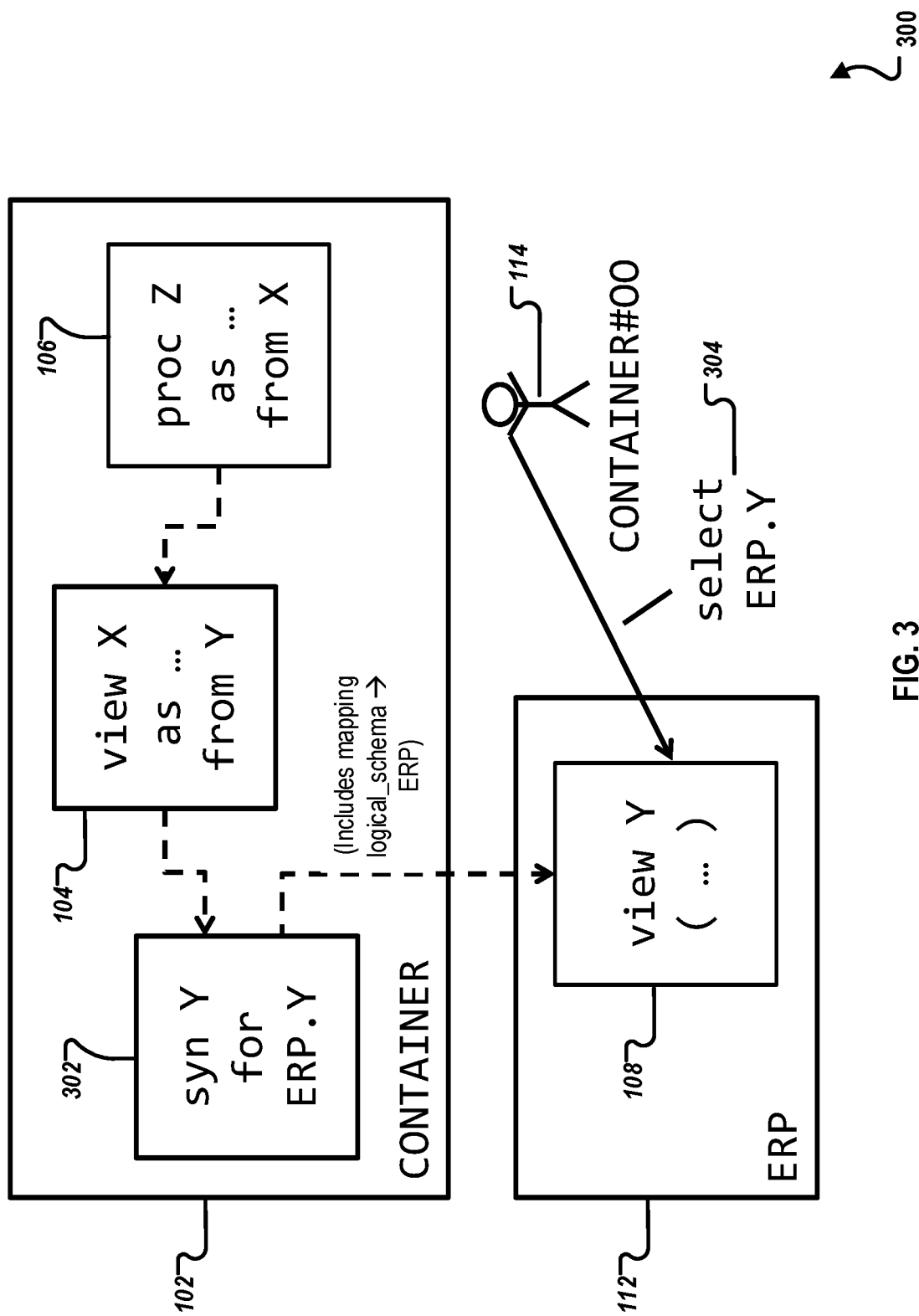
FIG. 3 is a block diagram illustrating an example synonym using a logical schema name that is mapped to an external schema consistent with the example of FIG. 1, according to an implementation.

FIG. 3 is a block diagram 300 illustrating an example synonym using a logical schema name that is mapped to an external schema consistent with the example of FIG. 1, according to an implementation. As in FIG. 1, container object owner 114 has, by default, no external access privileges to objects external to the database schema within container 102.

To break the default isolation between container 102 and ERP 112, the container object owner 114, for example, can be explicitly granted permissions to define a synonym 302 mapping the logical schema to ERP. The synonym uses a logical schema name which is mapped to an external schema (for example, ERP 112). For example, for synonym 302, "syn Y for logical schema.Y". An object (for example, view Y 108) can then be referenced with logical schema.Y which resolves to ERP.Y. Container object owner 114 is also explicitly granted permission to perform "SELECT ON ERP.Y" (with Grant Option) 304. Possessing SELECT privilege on ERP.Y is a prerequisite so that the container object owner 114 can access ERP.Y using the logical schema name.

Configuration parameters are used to configure the behavior of HANA DI. There are two types of configuration parameters in HANA DI: 1) HANA DI configuration parameters and 2) container-specific configuration parameters. HANA DI configuration parameters configure the general behavior of HANA DI (for example, specifying an amount of time a HANA DI operation waits for a locking conflict to clear or the default behavior of containers). Container-specific configuration parameters are used to control the behavior of a single container (for example, specifying an amount of time a container operation waits for a locking conflict to clear or a maximum number of parallel jobs to be spawned during a make).

Table 1 describes an implementation of the container-specific configuration parameters and possible values:

TABLE 1

| Container-Specific Configuration Parameter | Possible Values | Description |
| --- | --- | --- |
| make.force_logical_schema_targets | true, false | Indicates if the usage of logical schemas in DT |

TABLE 1-continued

| Container-Specific Configuration Parameter | Possible Values | Description |
| --- | --- | --- |
| <build plugin name, e.g., com.sap.hana.di.logicalschema>/disabled | true, false | artifacts should be forced. The default value is false. Indicated if the build plugin specified by the parameter should be disabled. By default, there is no such parameter set, i.e., no build plugin is disabled. |

An example of configuring a container with a container-specific configuration parameter could include:

```
-- Prepare configuration parameters table
create table MY_CONFIG_PARAMETERS like
_SYS_DI.TT_PARAMETERS;
  insert into MY_CONFIG_PARAMETERS(KEY, VALUE) values
('make.max_parallel_jobs', '10');
  -- Prepare parameters table
  create table MY_PARAMETERS like _SYS_DI.TT_PARAMETERS;
  -- Call procedure
  Call
MY_CONTAINER#DI.CONFIGURE_CONTAINER_PARAMETERS
(MY_CONFIG_PARAMETERS, MY_PARAMETERS, ?, ?, ?);.
```

A container configuration parameter is also exposed for disabling any build plugins (including the logical schema plugin), but not all at the same time. Enabling the configuration parameter prevents the definition of new content (for example, logical schema definitions) associated with a particular build plugin and deletion of already defined content associated with a particular build plugin. Here, security pertaining access to external schemas can be enhanced by permitting creation of logical schema definitions by a technical user with appropriate permissions. For all other uses, the logical schema plugin is disabled to prohibit creation of new logical schema definitions or deleting existing logical schema definitions. Moreover, with the configuration parameter engaged, artifacts (that is, the files containing a database object definitions) processed by a disabled build plugin cannot be undeployed, but revalidations of artifacts are still processed.

A container can also be configured to only allow references to logical schemas already deployed. By restricting references in a container to logical schemas already deployed, these logical schemas are only allowed when deploying new synonyms and projection views. For example, an allowed reference to a logical schema could be at 302, "syn Y for logical schema.Y." In this way, data security can be enhanced for a container by restricting use of non-approved synonyms and projection views pointing to external schemas. In some implementations, restriction of approved and non-approved synonyms and projection views pointing to external schemas can be restricted for each container individually. In some implementations, a container group (a higher-level grouping container used to group multiple containers) can be used to configure partial or global restrictions on approved or non-approved synonyms and projection views pointing to external schemas for containers within the container group.

Figure 4:
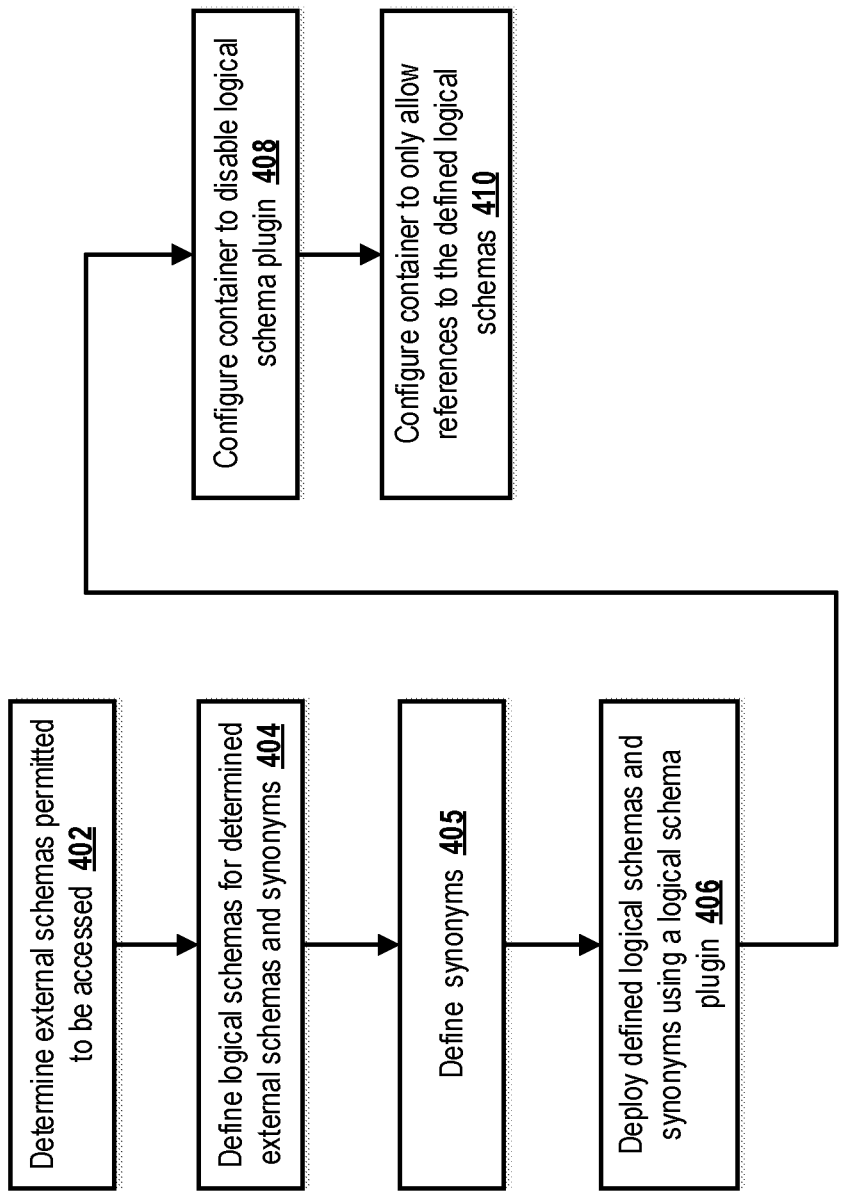
FIG. 4 is a flowchart of an example method for restricting access to external schemas from within a database level container by whitelisting allowed schemas, according to an implementation.

FIG. 4 is a flowchart of an example method 400 for restricting access to external schemas from within a database level container by whitelisting allowed schemas, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order. In an implementation, to create a whitelist of external schemas, a container administrator can:

At 402, external schemas permitted to be accessed by a container are determined. The determination is typically made by agreement between owners of external schemas. From 402, method 400 proceeds to 404.

At 404, logical schemas are defined for the container to permit access to the determined external schemas. Logical schema names are typically agreed upon by application developers. From 404, method 400 proceeds to 405.

At 405, one or more synonyms can be defined for the container using a defined logical schema and an object associated with a determined external database schema. From 405, method 400 proceeds to 406.

At 406, the defined logical schemas and synonyms are deployed to the container using the logical schema plugin. From 406, method 400 proceeds to 408.

At 408, the container is configured to disable the logical schema plugin. Disabling the logical schema plugin prevents definition of new logical schemas and the deletion of existing logical schema definitions from 404. From 408, method 400 proceeds to 410.

At 410, the container is configured to only allow references to defined logical schemas. This configuration prevents synonyms and projection views associated with the container, other than those defined at 404, to directly point to external schemas. After 410, method 400 stops.

Figure 5:
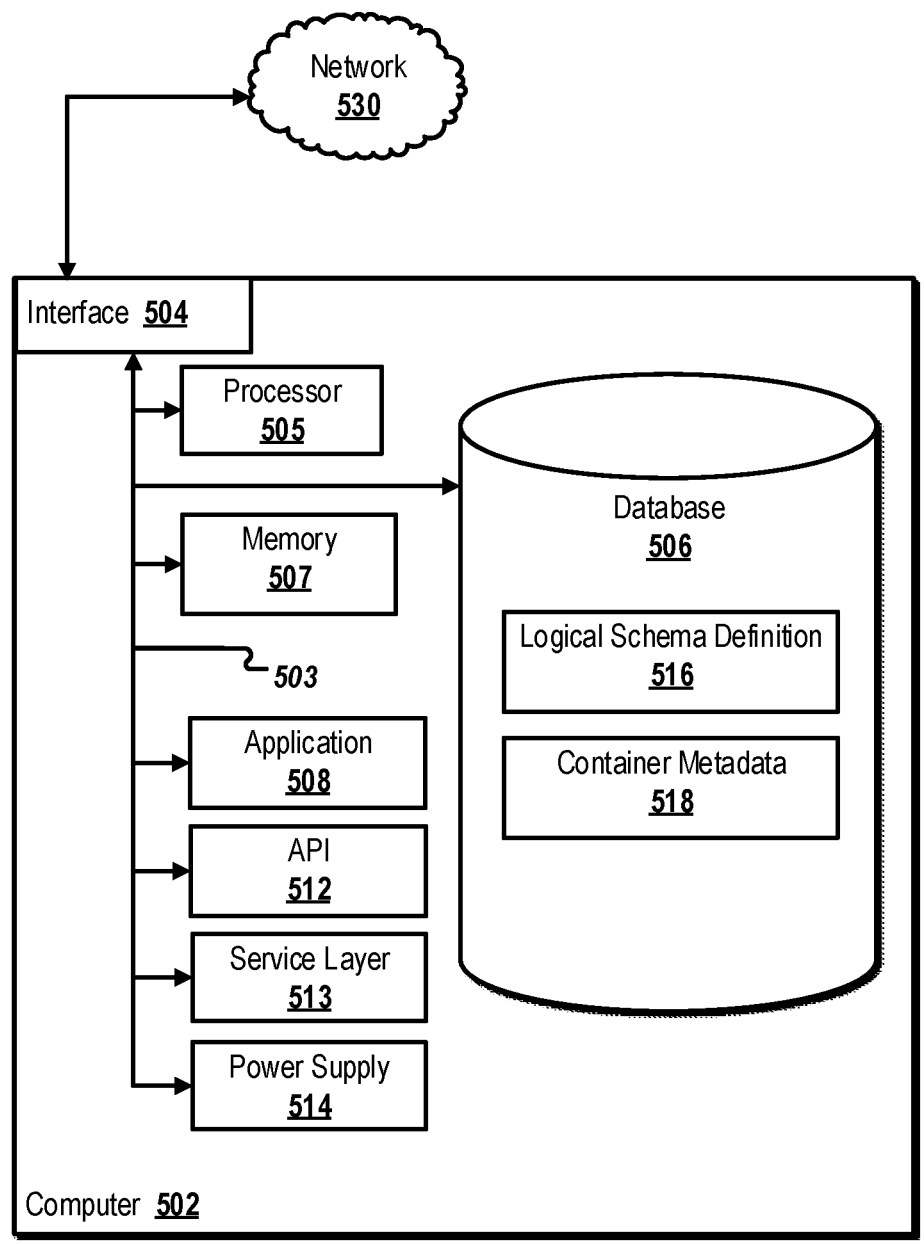
FIG. 5 is a block diagram illustrating an example computer system used to provide computational functionalities associated with described algorithms, methods, functions, processes, flows, and procedures as described in the instant disclosure, according to an implementation.

FIG. 5 is a block diagram of an example computer system 500 used to provide computational functionalities associated with described algorithms, methods, functions, processes, flows, and procedures, as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer 502) and respond to the received requests by processing the received requests using an appropriate software application(s). In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, hardware or software (or a combination of both hardware and software), may interface with each other or the interface 504 (or a combination of both), over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems that are connected to the network 530 (whether illustrated or not) in a distributed environment. Generally, the interface 504 comprises logic encoded in software or hardware (or a combination of software and hardware) and is operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502. As illustrated, the database 506 holds previously described Logical Schema Definition 516 and Container Metadata 518.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like, storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, or applications. Further, although illustrated as a single application 508, the application 508 may be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or other power management functionality). In some implementations, the power-supply 514 can include a power plug to allow the computer 502 to be plugged into a wall socket or other power source to, for example, power the computer 502 or recharge a rechargeable battery.

There may be any number of computers 502 associated with, or external to, a computer system containing computer 502, each computer 502 communicating over network 530. Further, the term "client," "user," and other appropriate terminology may be used interchangeably, as appropriate, without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method, comprising: determining an external database schema permitted to be accessed from a container using a database synonym; defining a logical schema representing the external database schema; defining a synonym for the container using the logical schema and an object associated with the external database schema; deploying the logical schema and synonym to the container using a logical schema plugin; configuring the container to disable the logical schema plugin; and configuring the container to only allow references to the defined logical schemas.

The foregoing and other described implementations can each, optionally, include one or more of the following features:

A first feature, combinable with any of the following features, further comprising defining a logical schema name for the logical schema that is mapped to the external database schema.

A second feature, combinable with any of the previous or following features, wherein the mapping of the logical schema name to the external database schema is stored in metadata associated with the container.

A third feature, combinable with any of the previous or following features, further comprising resolving the logical schema name to the external database schema when using the defined synonym.

A fourth feature, combinable with any of the previous or following features, wherein permission to access the external database schema is made by agreement with the owner of the external database schema and logical schema names are typically agreed upon by application developers.

A fifth feature, combinable with any of the previous or following features, wherein there is only one logical schema plugin.

A sixth feature, combinable with any of the previous or following features, wherein the logical schema plugin extracts a schema field from a logical schema artifact and persists the schema field as metadata.

In a second implementation, a non-transitory, computer-readable medium storing one or more instructions executable by a computer system to perform operations comprising: determining an external database schema permitted to be accessed from a container using a database synonym; defining a logical schema representing the external database schema; defining a synonym for the container using the logical schema and an object associated with the external database schema; deploying the logical schema and synonym to the container using a logical schema plugin; configuring the container to disable the logical schema plugin; and configuring the container to only allow references to the defined logical schemas.

The foregoing and other described implementations can each, optionally, include one or more of the following features:

A first feature, combinable with any of the following features, further comprising one or more instructions to define a logical schema name for the logical schema that is mapped to the external database schema.

A second feature, combinable with any of the previous or following features, wherein the mapping of the logical schema name to the external database schema is stored in metadata associated with the container.

A third feature, combinable with any of the previous or following features, further comprising one or more instructions to resolve the logical schema name to the external database schema when using the defined synonym.

A fourth feature, combinable with any of the previous or following features, wherein permission to access the external database schema is made by agreement with the owner of the external database schema and logical schema names are typically agreed upon by application developers.

A fifth feature, combinable with any of the previous or following features, wherein there is only one logical schema plugin.

A sixth feature, combinable with any of the previous or following features, wherein the logical schema plugin extracts a schema field from a logical schema artifact and persists the schema field as metadata.

In a third implementation, a computer-implemented system, comprising: a computer memory; and a hardware processor interoperably coupled with the computer memory and configured to perform operations comprising: determining an external database schema permitted to be accessed from a container using a database synonym; defining a logical schema representing the external database schema; defining a synonym for the container using the logical schema and an object associated with the external database schema; deploying the logical schema and synonym to the container using a logical schema plugin; configuring the container to disable the logical schema plugin; and configuring the container to only allow references to the defined logical schemas.

The foregoing and other described implementations can each, optionally, include one or more of the following features:

A first feature, combinable with any of the following features, further configured to define a logical schema name for the logical schema that is mapped to the external database schema.

A second feature, combinable with any of the previous or following features, wherein the mapping of the logical schema name to the external database schema is stored in metadata associated with the container.

A third feature, combinable with any of the previous or following features, further configured to resolve the logical schema name to the external database schema when using the defined synonym.

A fourth feature, combinable with any of the previous or following features, wherein permission to access the external database schema is made by agreement with the owner of the external database schema and logical schema names are typically agreed upon by application developers.

A fifth feature, combinable with any of the previous or following features, wherein there is only one logical schema plugin.

A sixth feature, combinable with any of the previous or following features, wherein the logical schema plugin extracts a schema field from a logical schema artifact and persists the schema field as metadata.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented method, comprising:
   determining an external database schema permitted to be accessed from a container using a database synonym;
   defining a logical schema representing the external database schema;

defining a synonym for the container using the logical schema and an object associated with the external database schema;

deploying the logical schema and synonym to the container using a logical schema plugin;

configuring the container to disable the logical schema plugin; and configuring the container to only allow references to the defined logical schemas.

2. The computer-implemented method of claim 1, further comprising defining a logical schema name for the logical schema that is mapped to the external database schema.

3. The computer-implemented method of claim 2, wherein the mapping of the logical schema name to the external database schema is stored in metadata associated with the container.

4. The computer-implemented method of claim 2, further comprising resolving the logical schema name to the external database schema when using the defined synonym.

5. The computer-implemented method of claim 1, wherein permission to access the external database schema is made by agreement with the owner of the external database schema and logical schema names are typically agreed upon by application developers.

6. The computer-implemented method of claim 1, wherein there is only one logical schema plugin.

7. The computer-implemented method of claim 1, wherein the logical schema plugin extracts a schema field from a logical schema artifact and persists the schema field as metadata.

8. A non-transitory, computer-readable medium storing one or more instructions executable by a computer system to perform operations comprising:

determining an external database schema permitted to be accessed from a container using a database synonym;

defining a logical schema representing the external database schema;

defining a synonym for the container using the logical schema and an object associated with the external database schema;

deploying the logical schema and synonym to the container using a logical schema plugin;

configuring the container to disable the logical schema plugin; and configuring the container to only allow references to the defined logical schemas.

9. The non-transitory, computer-readable medium of claim 8, further comprising one or more instructions to define a logical schema name for the logical schema that is mapped to the external database schema.

10. The non-transitory, computer-readable medium of claim 9, wherein the mapping of the logical schema name to the external database schema is stored in metadata associated with the container.

11. The non-transitory, computer-readable medium of claim 9, further comprising one or more instructions to resolve the logical schema name to the external database schema when using the defined synonym.

12. The non-transitory, computer-readable medium of claim 8, wherein permission to access the external database schema is made by agreement with the owner of the external database schema and logical schema names are typically agreed upon by application developers.

13. The non-transitory, computer-readable medium of claim 8, wherein there is only one logical schema plugin.

14. The non-transitory, computer-readable medium of claim 8, wherein the logical schema plugin extracts a schema field from a logical schema artifact and persists the schema field as metadata.

15. A computer-implemented system, comprising:

a computer memory; and a hardware processor interoperably coupled with the computer memory and configured to perform operations comprising:

determining an external database schema permitted to be accessed from a container using a database synonym;

defining a logical schema representing the external database schema;

defining a synonym for the container using the logical schema and an object associated with the external database schema;

deploying the logical schema and synonym to the container using a logical schema plugin;

configuring the container to disable the logical schema plugin; and configuring the container to only allow references to the defined logical schemas.

16. The computer-implemented system of claim 15, further configured to define a logical schema name for the logical schema that is mapped to the external database schema.

17. The computer-implemented system of claim 16, wherein the mapping of the logical schema name to the external database schema is stored in metadata associated with the container.

18. The computer-implemented system of claim 16, further configured to resolve the logical schema name to the external database schema when using the defined synonym.

19. The computer-implemented system of claim 15, wherein permission to access the external database schema is made by agreement with the owner of the external database schema and logical schema names are typically agreed upon by application developers.

20. The computer-implemented system of claim 15, wherein there is only one logical schema plugin and the logical schema plugin extracts a schema field from a logical schema artifact and persists the schema field as metadata.

* * * * *